(12) United States Patent
Meisel et al.

(10) Patent No.: US 9,136,074 B2
(45) Date of Patent: Sep. 15, 2015

(54) RESIDUAL-CURRENT CIRCUIT BREAKER

(75) Inventors: Rainer Meisel, Vienna (AT); Georg Ritzinger, Wolfpassing (AT)

(73) Assignee: EATON INDUSTRIES (AUSTRIA) GMBH, Schrems (AT)

( * ) Notice: Subject to any disclaimer, the term of this patent is extended or adjusted under 35 U.S.C. 154(b) by 26 days.

(21) Appl. No.: 14/008,592

(22) PCT Filed: Mar. 27, 2012

(86) PCT No.: PCT/EP2012/055414
§ 371 (c)(1),
(2), (4) Date: Sep. 30, 2013

(87) PCT Pub. No.: WO2012/130846
PCT Pub. Date: Oct. 4, 2012

(65) Prior Publication Data
US 2014/0022686 A1    Jan. 23, 2014

Related U.S. Application Data

(60) Provisional application No. 61/470,627, filed on Apr. 1, 2011.

(30) Foreign Application Priority Data

Apr. 1, 2011   (AT) ...................... 464/2011

(51) Int. Cl.
*H02H 3/00* (2006.01)
*H02H 9/08* (2006.01)
*H01H 9/54* (2006.01)
*H02H 3/33* (2006.01)

(52) U.S. Cl.
CPC *H01H 9/54* (2013.01); *H02H 3/332* (2013.01)

(58) Field of Classification Search
CPC .................................. H02H 3/33; H02H 3/332
USPC ........................................................ 361/42–50
See application file for complete search history.

(56) References Cited

U.S. PATENT DOCUMENTS

| 3,621,334 A | * | 11/1971 | Burns et al. ...................... 361/45 |
| 3,848,159 A | * | 11/1974 | Nye et al. ......................... 361/45 |
| 4,280,162 A | * | 7/1981 | Tanka et al. ...................... 361/45 |
| 5,969,930 A | * | 10/1999 | Bonniau et al. ................ 361/113 |

(Continued)

FOREIGN PATENT DOCUMENTS

| AT | 507202 B1 | * | 3/2010 |
| EP | 0866536 A2 | | 9/1998 |
| EP | 1478070 A1 | | 11/2004 |

(Continued)

OTHER PUBLICATIONS

Translation of WO 2010/018057. Feb. 18, 2010.*

*Primary Examiner* — Thienvu Tran
*Assistant Examiner* — Christopher Clark
(74) *Attorney, Agent, or Firm* — Leydig, Voit & Mayer, Ltd.

(57) ABSTRACT

A residual current circuit breaker having a core-balance current transformer for detecting a residual current, wherein a secondary winding is arranged on a core of the core-balance element transformer, wherein the residual current circuit breaker has an AC measurement arrangement and a DC measurement arrangement, wherein the AC and DC measurement arrangements are designed to operate simultaneously and in parallel.

20 Claims, 1 Drawing Sheet

(56) References Cited

U.S. PATENT DOCUMENTS

| | | | |
|---|---|---|---|
| 6,058,354 A * | 5/2000 | Adame et al. | 702/60 |
| 2005/0201026 A1* | 9/2005 | Ward | 361/42 |
| 2005/0212505 A1* | 9/2005 | Murray et al. | 324/126 |
| 2009/0315731 A1* | 12/2009 | Meisel et al. | 340/638 |
| 2010/0118449 A1* | 5/2010 | Jackson et al. | 361/42 |
| 2010/0134222 A1* | 6/2010 | Meisel et al. | 335/18 |
| 2012/0026631 A1* | 2/2012 | Kazemi et al. | 361/42 |

FOREIGN PATENT DOCUMENTS

| | | | | |
|---|---|---|---|---|
| GB | 2301498 A * | 12/1996 | | H01H 3/33 |
| GB | 2376360 A * | 12/2002 | | H02H 3/33 |
| WO | WO 2010018057 A1 * | 2/2010 | | H02H 3/33 |
| WO | 2010063043 A1 | 6/2010 | | |

* cited by examiner

RESIDUAL-CURRENT CIRCUIT BREAKER

CROSS-REFERENCE TO RELATED APPLICATIONS

This application is a U.S. National Phase application under 35 U.S.C. §371 of International Application No. PCT/EP2012/055414, filed on Mar. 27, 2012, and claims benefit to Austrian Patent Application No. 464/2011, and U.S. Provisional Application Ser. No. 61/470,627, each filed on Apr. 1, 2011. The International Application was published in German on Oct. 4, 2012, as WO 2012/130846 Al under PCT Article 21(2).

FIELD

The invention relates to a residual-current circuit breaker (RCCB) having a summation current transformer and a secondary winding arranged on a core.

BACKGROUND

There are known residual-current circuit breakers that are designed to detect residual currents, which can occur as direct current (DC) and/or as alternating current (AC). Due to the increase of electronic devices in the household that can create DC-like residual currents, the detection of DC-like residual currents is becoming increasingly important to guarantee the safety of the consumers.

Residual-current circuit breakers therefore include two residual-current detection sensors, one for DC-like residual currents and one for AC-like residual currents. Such residual-current circuit breakers are technically as well as economically very complex and have high space requirements, for example because two summation current transformers are required, which is the reason why such residual-current circuit breakers are not wide-spread.

A further development of such residual-current circuit breakers would be to use only one summation current transformer, whereby the residual-current sensors for direct-current and alternating-current access the summation current transformer alternately. However, this requires a switch that is switching between the two residual-current sensors.

The disadvantage of this is that this switch is constantly in operation and thereby causes interfering signals. In addition, the switch has to be operated with a high frequency so that the time period, in which one of the two residual-current sensors is inactive, does not exceed an acceptable extent. Due to the high frequency, only a small time window is available for the detection of AC-like residual currents, whereby the bandwidth is reduced and the detection of such AC-like residual currents is hindered. The high frequency also leads to a high energy consumption and thus to a high thermal stress of the switch and neighbouring components. Therefore, the switch only has a short lifespan or respectively, the switch can fail which also leads to the failure of the protection via the residual-current circuit breaker and this can result in serious, in the worst case scenario even fatal electrical accidents. In addition, such residual-current circuit breakers are still technically as well as economically very complex and they are not very wide-spread as a result.

SUMMARY

An aspect of the invention provides a residual-current circuit breaker, including: a summation current transformer configured to detect residual currents; a secondary winding arranged on a core of the summation current transformer; an alternating-current measuring arrangement; and a direct-current measuring arrangement, wherein the alternating-current measuring arrangement and the direct-current measuring arrangement are configured to operate in parallel.

DETAILED DESCRIPTION

Figure 1:
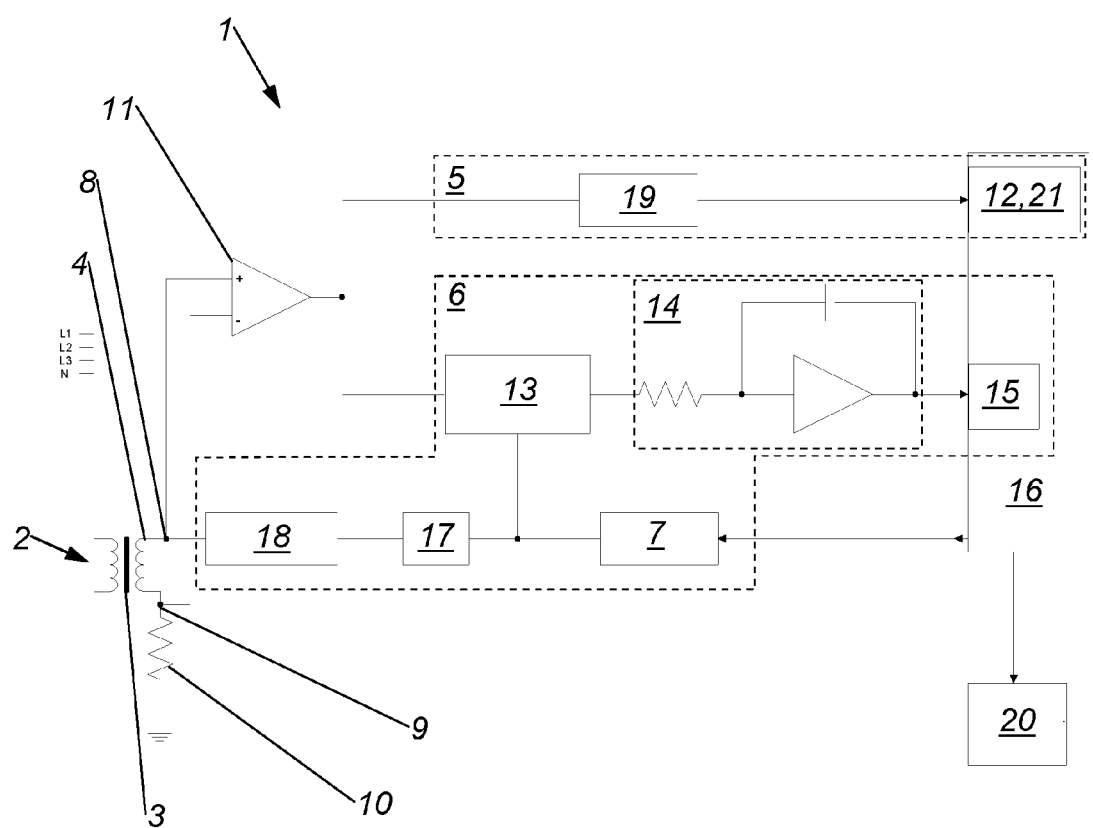
FIG. 1 depicts a block diagram of a preferred embodiment of the residual-current detector.

In an embodiment, the invention provides a residual-current circuit breaker, with which the listed disadvantages could be avoided, which can be produced in a simple, more cost-effective and resource-conserving manner, and which has lower space requirements.

Thereby, a residual-current detector can be constructed that can be produced in a simple, more cost-effective and resource-conserving manner, and that has lower space requirements. This also leads to the advantage that a residual-current circuit breaker can be constructed with only one summation current transformer, whereby AC-like as well as DC-like residual currents can be detected at the same time. Furthermore, such a residual-current circuit breaker requires only a small number of electronic components, most of all only one summation current transformer whereby it can be produced in a cost-effective and resource-preserving manner. This would lead to a wide distribution of such residual-current circuit breakers, whereby a better protection against electrical accidents could be achieved. Using less electrical components also lowers the risk of failure, whereby a good protection for the user can be achieved over a long period of time. Especially, the use of a switch that has a negative effect on the functionality and the lifespan of the residual-current circuit breaker can be omitted. Furthermore, a continuous network monitoring is basically achieved, because AC-like as well as DC-like residual currents can be detected at the same time, which leads to an increased safety. Moreover, due to the continuous monitoring, the resolution is not restricted by a limited time window, in which the scanning occurs.

An aspect of the invention provides a process for the action of a residual-current circuit breaker of the type described above, with which the listed disadvantages could be avoided, which can be produced in a simple, more cost-effective and resource-conserving manner, and by means of which a residual-current circuit breaker with lower space requirements could be realised.

The advantages of the process thereby correspond to the advantages described above.

The FIGURE shows a residual-current circuit breaker 1 with a summation current transformer 2 for the detection of residual currents, whereby a secondary winding 4 is arranged on a core 3 of the summation current transformer 2, whereby the residual-current circuit breaker 1 features an alternating-current measuring arrangement 5 and a direct-current measuring arrangement 6, whereby the alternating-current measuring arrangement 5 and direct-current measuring arrangement 6 are designed for parallel operation.

Thereby, a residual-current detector 1 can be constructed, which can be produced in a more simple, cost-effective and resource-conserving manner, and which has lower space requirements. This also results in the advantage that a residual-current circuit breaker 1 can be constructed with only one summation current transformer 2, whereby AC-like as well as DC-like residual currents can be detected at the same time. Furthermore, such a residual-current circuit breaker 1 requires only a small number of electronic components, most of all only one summation current transformer 2 whereby it can be produced in a cost-effective and resource-preserving manner. This would lead to a wide distribution of such residual-current circuit breakers 1, whereby a better protection against electrical accidents could be achieved. Using less electrical components also lowers the risk of failure, whereby a good protection for the user can be achieved over a long period of time. Especially, the use of a switch that has a negative effect on the functionality and the lifespan of the residual-current circuit breaker 1 can be omitted. Furthermore, a continuous network monitoring is basically achieved, because AC-like as well as DC-like residual currents can be detected at the same time, which leads to an increased safety. Moreover, due to the continuous monitoring, the resolution is not restricted by a limited time window, in which the scanning occurs.

A residual-current circuit breaker 1 is provided to monitor the electrical lines that connect a branch current network with a supply current network in regards to residual currents and to separate the branch current network from the supply current network in case residual currents occur.

According to the preferred embodiment, the residual-current circuit breaker has a four-pole design for the monitoring of the three phases L1, L2 and L3 as well as the neutral conductor N. The lines between the branch current network and the supply current network are combined to one line in the figure.

To separate the branch current network from the supply current network, the residual-current circuit breaker 1 features switch contacts, which however are not shown in the FIGURE.

The residual-current circuit breaker 1 features a current measuring device for the detection of residual currents, which is generally constructed as summation current transformer 2.

A summation current transformer 2 features a magnetisable core 3, which could be constructed, for example, as a weakly magnetic toroidal tape-wound core. According to the preferred embodiment, the three phases L1, L2 and L3 as well as the neutral conductor N form the primary winding of the summation current transformer 2. In addition, a secondary winding 4 is arranged at the core 3.

The residual-current circuit breaker 1 features an alternating-current measuring array 5. The alternating-current measuring array 5 is intended to detect AC-like residual currents.

It is preferably provided that the alternating-current measuring array 5 is designed to detect AC-like residual currents with a frequency of up to 100 kHz, especially up to 95 kHz. Thereby, AC-like residual currents can be detected across a large frequency range.

Furthermore, the residual-current circuit breaker 1 features a direct-current measuring array 6. The direct-current measuring array 6 is intended to detect DC-like residual currents.

In addition, it is provided that the alternating-current measuring array 5 and the direct-current measuring array 6 are designed for parallel operation.

A parallel operation in the sense of the invention means that the alternating-current measuring array 5 as well as the direct-current measuring array 6 are in continuous and/or uninterrupted operation and can therefore reliably detect AC-like and/or DC-like residual currents. The scanning via an analogue/digital converter, which in the stricter sense does not occur continuously but discretely, is deemed as continuous operation in the sense of the invention, because the residual-current signals are continuously or respectively uninterruptedly scanned by the analogue/digital converter.

It can be especially preferably provided that the alternating-current measuring array 5 and the direct-current measuring array 6 are connected circuitry-wise to the secondary winding 4 without a breaker. This way, a continuous protection against AC-like and/or DC-like residual currents can be achieved with a low power consumption at the same time.

According to the preferred embodiment it can be provided that the direct-current measuring array 6 features an oscillator unit 7 for the specifiable, especially non-linear, magnetisation of core 3 of the summation current transformer 2. By magnetising the core 3 in the non-linear range, it can be achieved that a clearly detectable signal is generated in case a DC-like residual current occurs.

Furthermore it is preferably provided that the oscillator unit 7 is circuitry-wise at least indirectly connected to the first contact point 8 of the secondary winding 4. As a result, the oscillating signal of the oscillator unit 7 can change the magnetisation of the core 3 via the secondary winding 4.

According to the preferred embodiment it can be provided that a frequency divider 17 is circuitry-wise arranged between the oscillator unit 7 and the first contact point 8 of the secondary winding 4. This makes it possible to supply an in-phase signal in an easy and effective manner, which features the double frequency of the signal at the secondary winding 4, because the signal, which applies at the secondary winding 4, only has half the frequency of the oscillator unit 7. The advantageous use of such a signal will be explained at a later point.

According to the preferred embodiment it can also be provided that an amplifying circuit 18, especially preferably an amplifying circuit 18 with a high input resistance, is circuitry-wise arranged between the frequency divider 17 and the first contact point 8 of the secondary winding 4. That way, the frequency and the amplitude of the oscillating unit 7 can basically be kept constant independent from the load, whereby a reliable long-term stability of the detection of DC-like residual currents can be achieved.

Moreover it can be preferably provided that a second contact point 9 of the secondary winding 4 is connected circuitry-wise to the ground via a first resistor 10. Thereby, the secondary winding 4 can be fixated to a reference potential on one side, whereby external interferences can be avoided and a good comparability of the results can be guaranteed.

The oscillating voltage difference in the secondary winding 4 preferably leads to a likewise oscillating magnetisation of the core 3. If the core 3 is magnetised by a DC-like residual current then this leads to an imbalance of the signal if the magnetisation is not in the non-linear range of the hysteresis curve. This imbalance creates a characteristic signal component with twice the frequency with which the secondary winding 4 is stimulated. A comparison signal with the double frequency—for the detection of the characteristic signal component—can be tapped in front of the frequency divider 17.

It can be preferably provided that the alternating-current measuring array 5 and the direct-current measuring array 6 is circuitry-wise at least indirectly connected with the first contact point 8 of the secondary winding 4 and the second contact point 9 of the secondary winding 4. Thus, the voltage difference in the secondary winding 4 can be used for the detection of residual currents. Thereby, already existing contact points 8, 9 can also be used, which leads to a reduction of the production costs. Thus, a further tapping in the secondary winding 4 can be omitted.

Furthermore, it can be preferably provided that a first input of a differential amplifier 11 is connected circuitry-wise to the first contact point 8 of the secondary winding 4 and that a second input of the differential amplifier 11 is connected circuitry-wise to the second contact point 9 of the secondary winding 4. As a result, the signal of the secondary winding 4 can be evaluated largely without effect on this signal, because the differential amplifier 11 has a high input resistance and thus, only little power can be discharged by the differential amplifier 11. A good common-mode-rejection can also be achieved therewith.

According to the preferred embodiment in the figure, it can be provided that the signal at the output of the differential amplifier 11 is evaluated via two different paths, whereas the first path is a part of the alternating-current measuring arrangement 5 and the second path is part of the direct-current measuring arrangement 6.

It can be preferably provided that one output of the differential amplifier 11 is connected at least indirectly to one first analogue/digital converter 12. The first analogue/digital converter 12 thereby serves the detection of the AC-like residual current. This also enables the further processing of the signal by a microprocessor 16.

It can thereby be preferably provided that an antialiasing filter 19 is circuitry-wise arranged between the output of the differential amplifier 11 and the first analogue/digital converter 12. Aliasing effects during the scanning via the first analogue/digital converter 12 can thus be prevented.

Furthermore, it can be preferably provided that the alternating-current measuring arrangement 5 includes a comb filter 21, which removes a signal component with a specifiable frequency and the integer multiple of this specifiable frequency from the signal.

It is thereby preferably provided that the specifiable frequency corresponds to the frequency of the oscillator unit 7 or half the frequency of the oscillator unit 7. As a result, the alternating-current signals that are caused by the oscillator unit 7 can be removed and those alternating-current signals that are not caused by the oscillator unit 7 can be reliably detected.

According to the preferred embodiment it can be provided that the output of the differential amplifier 11 is connected to a second analogue/digital converter 15 by way of a synchronous detector 13 and an integrator 14. The second analogue/digital converter 15 thereby serves the detection of the DC-like residual current. This enables the further processing of the signal by a microprocessor 16.

The synchronous detector 13 is preferably connected circuitry-wise to the oscillator unit 7. This way, the synchronous detector 13 filters out those parts of the signal that are in phase with the signal of the oscillator unit 7. Those parts of the signal at the output of the differential amplifier 11, which feature the twice the frequency with which the voltage difference oscillates at the secondary winding 4, are thereby characteristic for the distortions of the magnetisation of the core 3, which are caused by a DC-like residual current.

By integrating the output signal of the synchronous detector 13 via the integrator 14, a voltage value is generated that is proportional to the DC-like residual current. This enables the possibility to measure and/or assess the DC-like residual current.

According to the preferred embodiment, the integrator 14 can thereby include a resistor, an operational amplifier or a capacitor. However, the integrator 14 can also be constructed in countless other ways.

Furthermore it can be preferably provided that the alternating-current measuring arrangement 5 and the direct-current measuring arrangement 6 comprise a microprocessor 16 or a micro-controller. This way, several steps can be carried out in a resource-conserving and reliable manner. In addition, a microprocessor 16 or micro-controller is very flexible for the data processing. For example, an event protocol can be created via the microprocessor 16, which makes it easier to later determine the cause of the residual currents. A microprocessor 16 also provides the possibility of additional functions of the residual-current circuit breaker 1, for example an occasional demagnetisation of summation current transformer 2. In addition, a subsequent update is possible and the residual-current circuit breaker 1 can thus easily be kept up-to-date.

It can be preferably provided that the microprocessor 16 is designed to split the incoming signal into a frequency spectrum, for example via FFT.

It can be preferably provided that the first analogue/digital converter 12 and/or the second analogue/digital converter 15 are constructed as part of the microprocessor 16. This way, the first analogue/digital converter 12 and/or the second analogue/digital converter 15 can be designed in a reliable and resource-conserving manner It can especially be preferably provided that the comb filter 21 is constructed as part of the microprocessor 16. That way, the comb filter 21 can also have an especially simple design. In addition, the microprocessor 16 can form a comb filter 21 with high selectivity or high order.

Alternatively it can be provided that the comb filter 21 is designed as separate circuit, for example as programmable logic circuit.

It can also be preferably provided that the microprocessor 16 is circuitry-wise connected to the oscillator unit 7 to control the oscillator unit 7. The oscillator 7 can also be integrated in the microprocessor 16.

It also is preferably provided that the microprocessor 16 is connected to the actuator, especially a permanent magnet actuator 20, of the residual-current circuit breaker 1. That way, the microprocessor 16 can trigger the residual-current circuit breaker 1 in case a residual current is detected.

In addition, the invention includes a process for the detection of residual currents, whereby an occurring residual current is centrally captured via a current measuring device, especially a summation current transformer 2 and a residual-current signal is generated, whereby the residual-current signal is assessed regarding the direct-current shares of the residual current and the alternating-current shares of the residual current at the same time. This makes it possible to achieve the aforementioned advantages.

The direct-current share of the residual-current signal is thereby that share of the residual-current signal, which is caused by a DC-like residual current. The alternating-current share of the residual-current signal is thereby that share of the residual-current signal, which is caused by a AC-like residual current.

It also can be preferably provided that the current measuring device—designed as summation current transformer 2—is specifiable magnetised in an alternating, especially non-linear manner. A constant magnetisation of the summation current transformer 2 thereby leads to an imbalance of the magnetisation due to a DC-like residual current. As mentioned before, this imbalance can be used to detect the DC-like residual current.

It can also be preferably provided that the residual current signal is filtered with a comb filter 21 before the capture of the alternating-current share of the residual current. The frequencies of the signal component that is removed from the residual-current signal by the comb filter correspond to the frequency with which the summation current transformer 2 is alternatingly magnetised as well as the harmonic of this frequency. Therefore, the detection of the alternating-current shares of the residual current is not affected by the alternating magnetisation of the summation current transformer 2.

Furthermore, the bandwidth of residual-current signal can preferably be restricted using an antialiasing filter 19 to suppress the occurrence of the antialiasing effect.

It can be preferably provided that the residual-current signal is scanned synchronously and in-phase with the double frequency of the alternating magnetisation of the summation current transformer 2 to detect the direct-current shares of the residual-current signal. That way, a DC-like residual current can be reliably detected because the uniform magnetisation of the summation current transformer 2 caused by the DC-like residual current leads to a characteristic residual-current signal, which is synchronous and in-phase with the double frequency of the alternating magnetisation of the summation current transformer 2.

Other embodiments as per invention only show a part of the features described, though every combination of features, in particular of the various embodiments described, is possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A residual-current circuit breaker, comprising:
    a summation current transformer configured to detect residual currents;
    a secondary winding arranged on a core of the summation current transformer;
    an alternating-current measuring arrangement; and
    a direct-current measuring arrangement,
    wherein the alternating-current measuring arrangement and the direct-current measuring arrangement are configured to operate in parallel,
    wherein a second contact point of the secondary winding is circuitry-wise connected to the ground by way of a first resistor, and
    wherein a first input of a differential amplifier is connected circuitry-wise to a first contact point of the secondary winding and a second input of the differential amplifier is connected circuitry-wise to the second contact point of the secondary winding.

2. The residual-current circuit breaker of claim 1, wherein the alternating-current measuring arrangement and the direct-current measuring arrangement are connected circuitry-wise to the secondary winding without a breaker.

3. The residual-current circuit breaker of claim 1, wherein the direct-current measuring arrangement includes an oscillator unit, for specifiable magnetization of the core of the summation current transformer.

4. The residual-current circuit breaker of claim 3, wherein the oscillator unit is at least indirectly connected circuitry-wise to a first contact point of the secondary winding.

5. The residual-current circuit breaker of claim 1, wherein the alternating-current measuring arrangement and the direct-current measuring arrangement are circuitry-wise at least indirectly connected to a first contact point of the secondary winding and the second contact point of the secondary winding.

6. The residual-current circuit breaker of claim 1, wherein an output of the differential amplifier is connected at least indirectly to a first analog/digital converter.

7. The residual-current circuit breaker of claim 1, wherein an output of the differential amplifier is connected to a second analog/digital converter by way of a synchronous detector and an integrator.

8. The residual-current circuit breaker of claim 1, wherein the alternating-current measuring arrangement and the direct-current measuring arrangement comprise a microprocessor.

9. The residual-current circuit breaker of claim 7, wherein the alternating-current measuring arrangement and the direct-current measuring arrangement comprise a microprocessor,
    wherein an output of the differential amplifier is connected at least indirectly to a first analog/digital converter, and
    wherein at least one of the first analog/digital converter and the second analog/digital converter are constructed as part of the microprocessor.

10. The residual-current circuit breaker of claim 1, wherein the direct-current measuring arrangement includes an oscillator unit, for the specifiable, non-linear magnetization of the core of the summation current transformer.

11. The residual-current circuit breaker of claim 1, wherein an output of the differential amplifier is connected directly to a first analog/digital converter.

12. A residual-current circuit breaker, comprising:
    a summation current transformer configured to detect residual currents;
    a secondary winding arranged on a core of the summation current transformer;
    an alternating-current measuring arrangement; and
    a direct-current measuring arrangement,
    wherein the alternating-current measuring arrangement and the direct-current measuring arrangement are configured to operate in parallel,
    wherein a second contact point of the secondary winding is circuitry-wise connected to the ground by way of a first resistor,
    wherein a first input of a differential amplifier is connected circuitry-wise to a first contact point of the secondary winding and a second input of the differential amplifier is connected circuitry-wise to the second contact point of the secondary winding, and
    wherein an output of the differential amplifier is connected at least indirectly to a first analog/digital converter.

13. The residual-current circuit breaker of claim 12, wherein the alternating-current measuring arrangement and the direct-current measuring arrangement are connected circuitry-wise to the secondary winding without a breaker.

14. The residual-current circuit breaker of claim 12, wherein the direct-current measuring arrangement includes an oscillator unit, for specifiable magnetization of the core of the summation current transformer.

15. The residual-current circuit breaker of claim 14, wherein the oscillator unit is at least indirectly connected circuitry-wise to a first contact point of the secondary winding.

16. The residual-current circuit breaker of claim 12, wherein the alternating-current measuring arrangement and the direct-current measuring arrangement are circuitry-wise at least indirectly connected to a first contact point of the secondary winding and the second contact point of the secondary winding.

17. A residual-current circuit breaker, comprising:
a summation current transformer configured to detect residual currents;
a secondary winding arranged on a core of the summation current transformer;
an alternating-current measuring arrangement; and
a direct-current measuring arrangement,
wherein the alternating-current measuring arrangement and the direct-current measuring arrangement are configured to operate in parallel,
wherein a second contact point of the secondary winding is circuitry-wise connected to the ground by way of a first resistor,
wherein a first input of a differential amplifier is connected circuitry-wise to a first contact point of the secondary winding and a second input of the differential amplifier is connected circuitry-wise to the second contact point of the secondary winding, and
wherein an output of the differential amplifier is connected to a second analog/digital converter by way of a synchronous detector and an integrator.

18. The residual-current circuit breaker of claim 17, wherein the alternating-current measuring arrangement and the direct-current measuring arrangement are connected circuitry-wise to the secondary winding without a breaker.

19. The residual-current circuit breaker of claim 17, wherein the direct-current measuring arrangement includes an oscillator unit, for specifiable magnetization of the core of the summation current transformer.

20. The residual-current circuit breaker of claim 19, wherein the oscillator unit is at least indirectly connected circuitry-wise to a first contact point of the secondary winding.

* * * * *